United States Patent [19]

Brandenburg et al.

[11] 4,375,956
[45] Mar. 8, 1983

[54] HOT BLAST STOVE ARRANGEMENT FOR A BLAST FURNACE

[75] Inventors: Jan H. Brandenburg; Cornelis van Herk, both of Ijmuiden, Netherlands

[73] Assignee: Hoogovens Ijmuiden B.V., Ijmuiden, Netherlands

[21] Appl. No.: 187,454

[22] Filed: Sep. 15, 1980

Related U.S. Application Data

[63] Continuation of Ser. No. 962,669, Nov. 21, 1978, abandoned.

[30] Foreign Application Priority Data

Nov. 30, 1977 [NL] Netherlands .......................... 7713191

[51] Int. Cl.³ .......................... F27D 23/00; C21B 7/00
[52] U.S. Cl. .......................................... 432/76; 432/3; 432/40; 432/214; 432/217; 266/139
[58] Field of Search .................. 432/214, 216, 217, 28, 432/3, 76, 40, 30; 266/139

[56] References Cited

U.S. PATENT DOCUMENTS

| | | | |
|---|---|---|---|
| 314,573 | 3/1885 | Gordon | 432/217 |
| 1,064,061 | 6/1913 | Dyblie | 432/40 |
| 1,677,002 | 7/1928 | Olson et al. | 432/76 |
| 1,985,234 | 12/1934 | Beardsley et al. | 432/217 |
| 2,225,751 | 12/1940 | McKee | 432/214 |
| 3,690,627 | 9/1972 | van Herk et al. | 432/40 |
| 3,901,646 | 8/1975 | Coenders et al. | 432/214 |
| 3,966,393 | 6/1976 | Takeuchi | 432/214 |
| 4,078,776 | 3/1978 | Brandenburg | 248/60 |

FOREIGN PATENT DOCUMENTS 250707  9/1912  Fed. Rep. of Germany ...... 432/218

*Primary Examiner*—Henry C. Yuen
*Attorney, Agent, or Firm*—Stevens, Davis, Miller & Mosher

[57] ABSTRACT

In a support construction for a hot blast main which is connected by respective branches to the outlets of a plurality of hot blast stoves of a blast furnace, the main is suspended on each stove by means of a rod system secured to a stiffened transitional region between the wall and dome of the stove and having an outer end located above the main. The main is suspended from this outer end, to which at least one strut extends from the stove wall adjacent the hot blast outlet. A travelling crane track is secured to the lower side of the rod systems so as to extend above valves incorporated in the hot blast branches. Thus these valves can easily be removed and replaced.

3 Claims, 4 Drawing Figures

HOT BLAST STOVE ARRANGEMENT FOR A BLAST FURNACE

This is a Continuation of application Ser. No. 962,669 filed Nov. 21, 1978, now abandoned.

BACKGROUND OF THE INVENTION

1. Field of the Invention

The invention relates to a hot blast stove arrangement for a blast furnace and is particularly concerned with the suspension of a hot blast main which is connected by branches to the hot blast outlets of a plurality of hot blast stoves.

2. Description of the Prior Art

A hot blast arrangement is known (see for instance Dutch published patent application No. 75.11424 and corresponding U.K. patent specification No. 1,529,390) having a support structure for the hot blast main adjacent a hot blast stove, in which the main is suspended by a vertical rod from a hinge which is carried by a horizontal rod system attached to the stove and by at least one strut extending diagonally to the stove wall adjacent the outlet of the stove.

An advantage of this known construction is that vertical movements of the hot blast outlet caused by variations in temperature in the hot blast stove produce much less strain in the branch connecting the hot blast main to the hot blast outlet. In fact, the hot blast main moves vertically to almost the same extent as the hot blast outlet.

SUMMARY OF THE INVENTION

It is the object of this invention to improve this known construction, so as to make it stronger and to reduce strains occurring in the support structure, while at the same time providing means simplifying removal and replacement of valves provided in the branches leading from the hot blast outlets to the hot blast main.

According to the invention, the above described known construction is improved in that the rod system is mounted on a stiffened transitional region connecting the vertical outer wall of the stove to the dome of the stove and a travelling crane track is provided at the lower side of the rod systems so as to extend above valves incorporated in the said hot blast branches.

By making the connection of the preferably horizontal rod system to the strengthened transitional zone of the stove, i.e. higher up the hot blast stove than in the prior construction, a reduction of the forces occurring in the horizontal rod system and the diagonal strut or struts can be obtained. In addition the force applied by the horizontal rod system to the stove is smaller, while this force occurs at a specially stiffened place in the stove construction.

Another advantage is that the crane track is easily provided, and may run along all the hot blast stoves associated with one blast furnace. A traversing crane on this track can be very easily used for assembling and disassembling the valves in the hot blast branches, greatly simplifying this operation. This crane track can be of a relatively light design, it being suspended at several places to the respective rod systems, and need not for instance be fixed by brackets to the hot blast stove itself.

In the construction of Dutch patent application 75.11424, a bellows compensator is mounted in each hot blast branch between the valve and the hot blast main. Its purpose is to assist mounting and dismounting of the valve, the bellows being compressible. This makes room for the operation of removal or replacement of the valve. In the invention, however, the hot air main is hung onto a longer suspension member, and a further simplification can be obtained, if the valve is connected by flanges directly to the portions of the branch connected respectively to the hot blast stove and to the hot blast main, and at or near the flanges on these branch portions abutment points for a pusher installation are provided. Thus the bellows compensator in each of the hot blast branches may be omitted, while instead the space required is obtained by pushing the adjacent part of the hot blast main away by means of the pusher installation (e.g. a piston and cylinder) acting on the abutment points at or near the flanges.

According to the invention it is further recommended to provide bellows construction sections in the hot blast main on both sides of the connection to the hot blast branch. This feature is in itself known. These bellows construction sections allow displacement in a horizontal direction, in the event of disassembly of a valve, of only the part of the hot blast main between the two bellows constructions. These bellows can also accommodate vertical movement of a single hot blast branch with the part of the hot blast main connected to it, this movement resulting from temperature differences between the different hot blast stoves.

BRIEF DESCRIPTION OF THE DRAWINGS

An embodiment of the invention is described below, by way of example only, with reference to the accompanying drawings, in which.

DESCRIPTION OF THE PREFERRED EMBODIMENT

Figure 1:
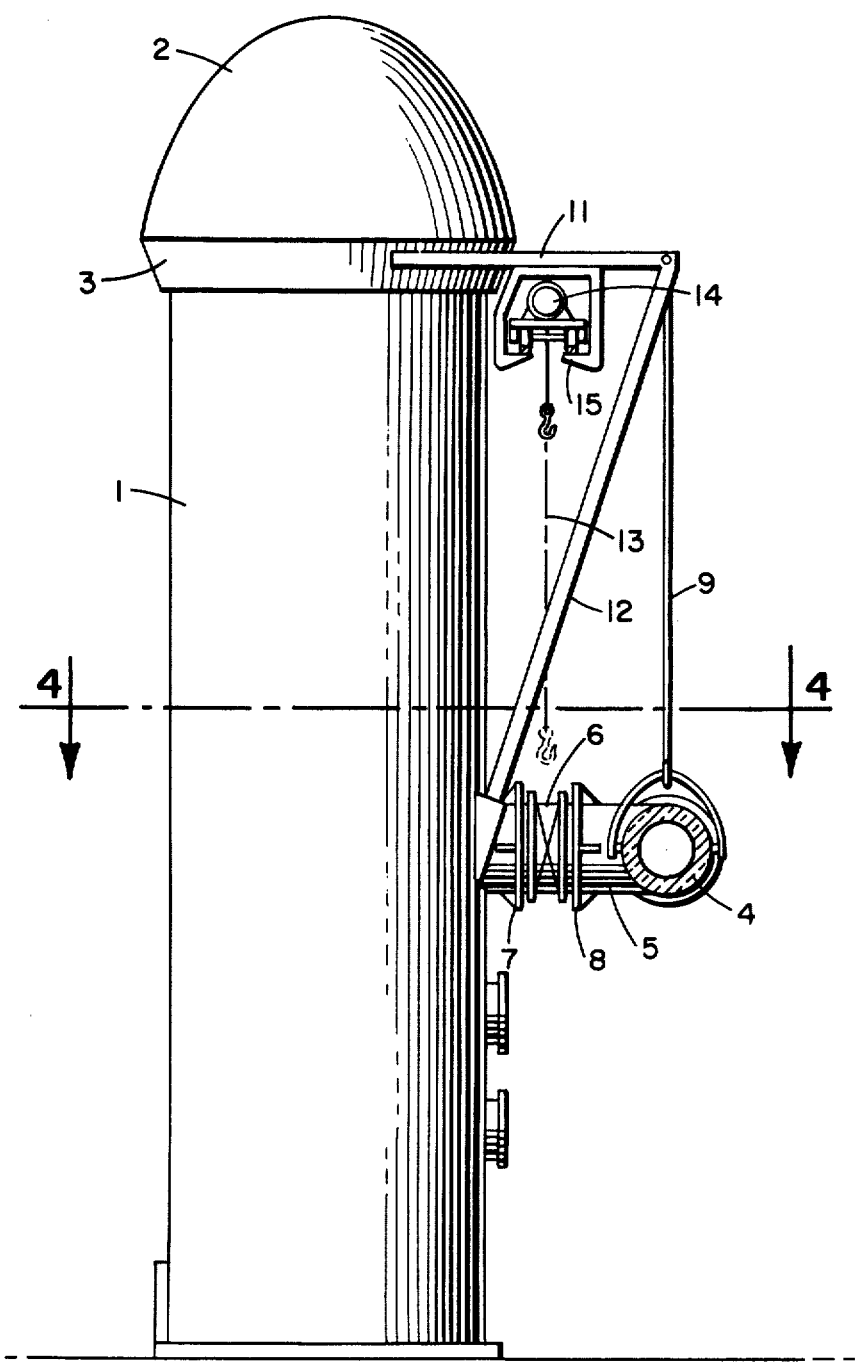
FIG. 1 is a side elevational view of a hot blast stove in an arrangement embodying the invention.
Figure 2:
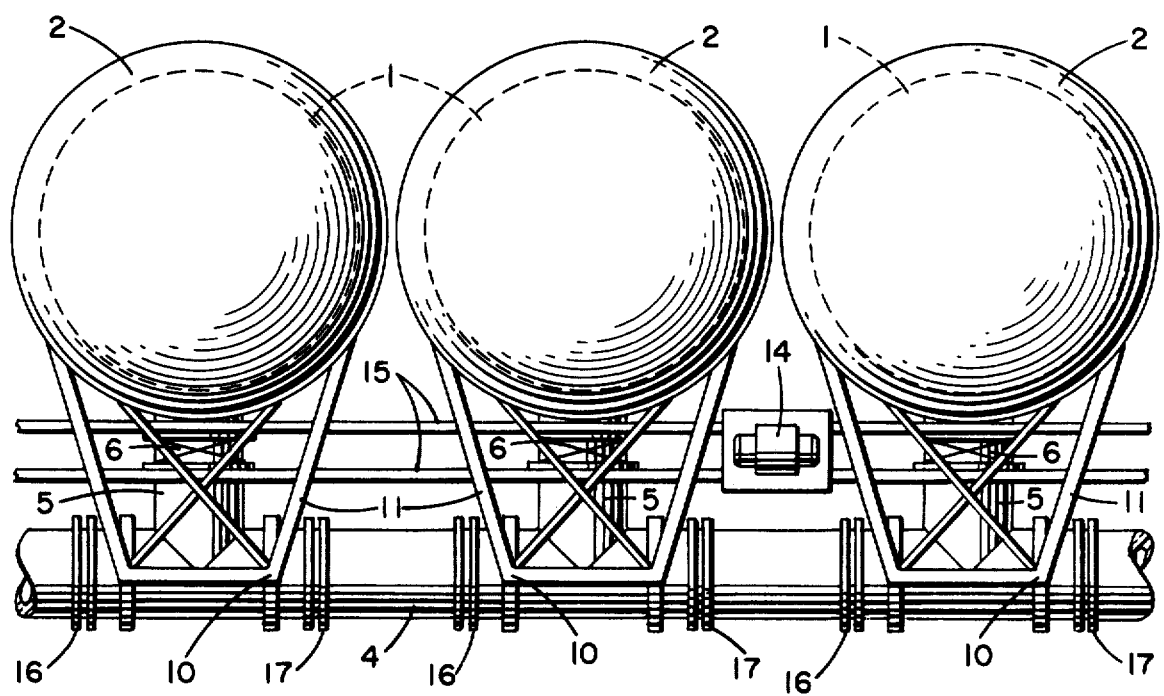
FIG. 2 is a top plan view of several hot blast stoves of FIG. 1 arranged in a row.
Figure 4:
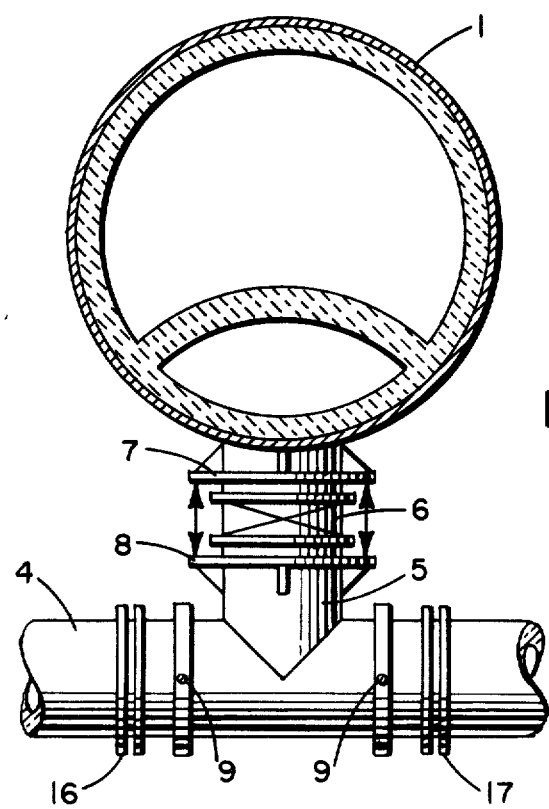
FIG. 4 is a horizontal cross-sectional view taken on the line 4—4 of FIG. 1.
Figure 3:
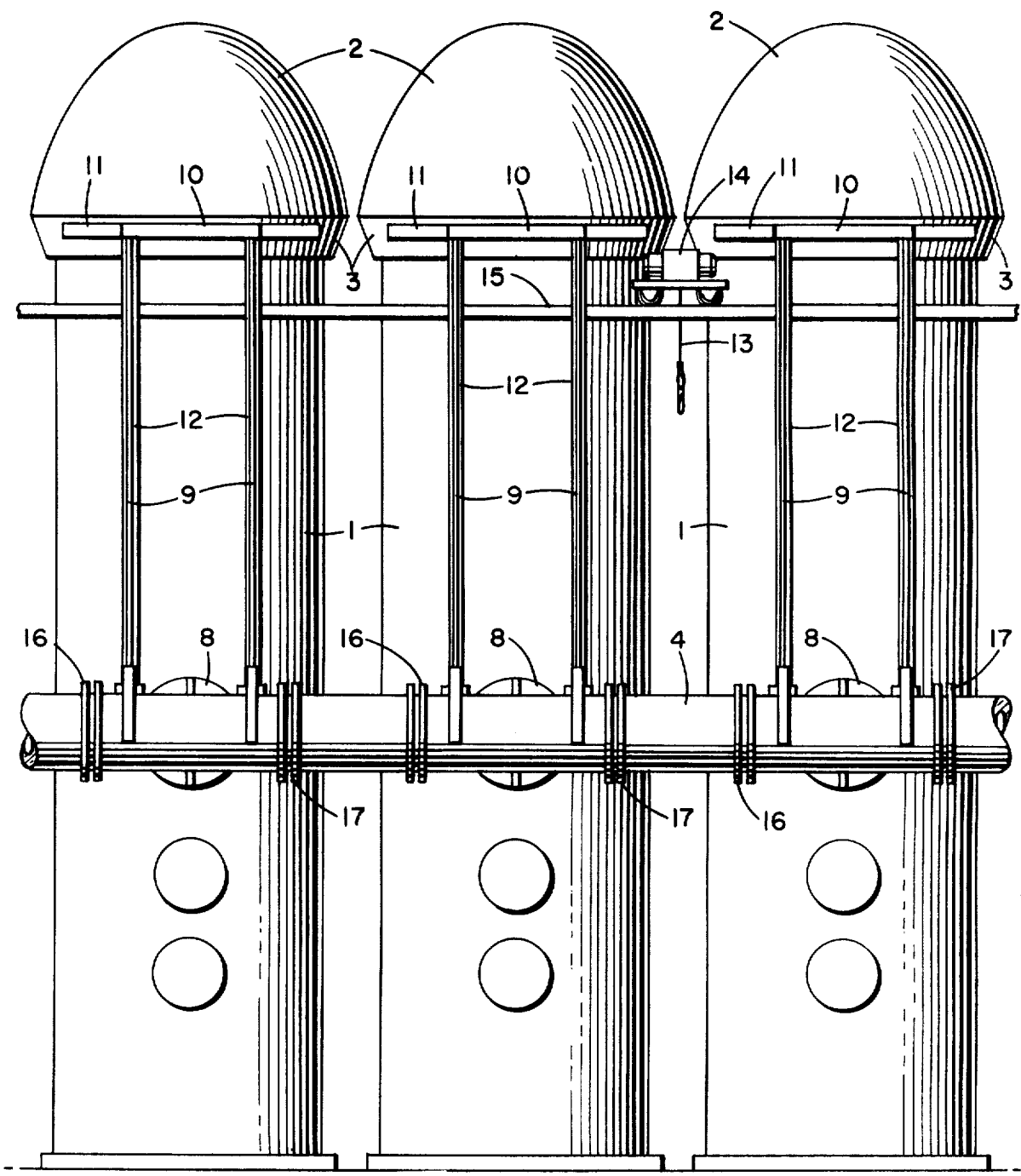
FIG. 3 is a front elevational view of the several stoves shown in FIG. 2.

The hot blast stove shown in FIGS. 1 to 3 has a cylindrical outer shell 1 and a roof dome 2 which is connected to the cylindrical shell 1 by means of a rigid conical ring construction forming a transitional region 3. For one blast furnace, a plurality of such stoves are arranged in a row (see FIG. 2).

A hot blast main 4 is connected by means of hot blast branch 5 to each of the hot blast stoves. The hot blast branch 5 incorporates a hot blast slide valve 6 of a construction known per se. The valve 6 is fixed by flange connections in the hot blast branch, between portions respectively connected to the hot blast outlet of the stove and the main 4. Adjacent the flanges on these portions of the branches additional support or abutment rings 7 and 8 are provided. In FIG. 3 double arrows indicate schematically the place where the pusher apparatus, e.g. a hydraulic jack, can be mounted between these abutment rings 7, 8 in order to hold the flanges apart when the valve 6 is being removed or installed. The pusher may in fact be used to push the rings 7, 8 apart, so as to allow more room for insertion of a valve 6.

The hot blast main 4 is suspended by means of vertical rods 9 from a hinge or nodal point 10, which is connected itself to the stiffened ring 3 of the stove by means of the horizontal rod system 11. The hinge 10 forms the outer end of the system 11. The hinge 10 is also supported by two struts 12 which extend diagonally to a location on the outer wall of the stove adjacent the hot air outlet.

Fixed to the lower side of the rod systems 11 of a plurality of hot blast stoves which are arranged side by side and are connected to the same hot blast main 4 is a crane track 15 on which runs a traversing trolley carrying a hoist 14 for a hook. As the track 15 is located above the valves 6, each valve 6 can be mounted and dismounted by means of hoist 14 whose cable descends along the line 13. The traversing trolley can be used for several hot blast stoves.

It is to be noted that there is no bellows construction in the branch 5, such as is present in the previously known installation. By means of the pusher apparatus mentioned above it is possible to push away the portion of the hot blast main 4 near the hot blast branch 5, even horizontally. Since the rods 9 are much longer than hitherto, this pushing away of the adjoining part of the hot blast main requires much less effort than previously. It has appeared that using a simple ten ton jack as the pusher apparatus, assembly and dismantling work could be carried out without special problems. The same pusher apparatus can also be used during assembly to press the various flanges of the hot blast branch and the valve tightly together.

In the main 4, at each side of each connection of the main 4 to a branch 5, there is a bellows-construction section 16,17. The bellows sections 16,17 permit displacement of the part of the main between them in a horizontal direction with no requirement for movement of the rest of the hot blast main. The bellows sections 16,17 also accommodate the relative vertical displacements of the hot blast branches of the different hot blast stoves occurring as a consequence of changes in temperature in the various hot blast stoves.

What is claimed is:

1. A hot blast stove arrangement for a blast furnace, comprising a plurality of hot blast stoves each having a vertical outer wall, a roof dome, a hot blast outlet in said outer wall, a rigid conical ring interconnecting said outer wall and said dome and creating a stiffened transitional region;

a hot blast main;

a plurality of hot blast branches respectively connecting said hot blast outlets of said stoves to said main, each branch having a removable valve by which it can be shut off;

a plurality of support structures for the hot blast main respectively mounted on the respective stoves to support the main adjacent each stove, each support structure comprising a rod system mounted on said rigid conical ring and extending outwardly therefrom to an outer end located above the hot blast main, at least one suspension element suspending the main from said outer end of the rod system in a manner permitting horizontal movement of the main towards and away from the stove, and at least one loadbearing strut connected at one end to the said outer end of the rod system and at its other end to the outer wall of the stove adjacent the hot blast outlet; and a crane track mounted at the lower side of said rod systems of said support structures so as to extend along above said valves in the hot blast branches whereby a traversing crane running on said track can be used to remove said valves from the branches.

2. An arrangement according to claim 1 wherein each said valve is mounted in the hot blast branch by means of flanges respectively secured to further flanges provided on the portions of said branch leading respectively to the hot blast outlet of the stove and the hot blast main, at or near said further flanges respectively there being provided abutment points circumscribing the hot blast branch outside of said further flanges.

3. An arrangement according to either of claims 1 and 2 wherein the hot blast main has bellows construction sections on both sides of the connection point of at least one of said hot blast branches into the main.

* * * * *